United States Patent
Tosato et al.

(10) Patent No.: US 10,411,771 B2
(45) Date of Patent: Sep. 10, 2019

(54) WIRELESS COMMUNICATION METHODS AND APPARATUS

(71) Applicant: KABUSHIKI KAISHA TOSHIBA, Tokyo (JP)

(72) Inventors: Filippo Tosato, Bristol (GB); Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/506,590

(22) PCT Filed: Mar. 30, 2015

(86) PCT No.: PCT/GB2015/050959
§ 371 (c)(1),
(2) Date: Feb. 24, 2017

(87) PCT Pub. No.: WO2016/156765
PCT Pub. Date: Oct. 6, 2016

(65) Prior Publication Data
US 2018/0013473 A1    Jan. 11, 2018

(51) Int. Cl.
*H04B 7/04* (2017.01)
*H04B 7/0456* (2017.01)
(Continued)

(52) U.S. Cl.
CPC ......... *H04B 7/0465* (2013.01); *H04B 7/0615* (2013.01); *H04L 1/0044* (2013.01);
(Continued)

(58) Field of Classification Search
CPC . H04L 1/0687; H04L 25/0248; H04B 7/0417; H04B 7/0632; H04B 7/0413; H04B 7/0452; H04B 7/0465; H04B 7/0619
(Continued)

(56) References Cited

U.S. PATENT DOCUMENTS 7,944,985 B2 * 5/2011 ElGamal ............... H04L 1/0003
375/267
9,319,197 B2 * 4/2016 Sahin ................... H04L 1/0025
(Continued)

FOREIGN PATENT DOCUMENTS

WO    WO 2006/020741 A2    2/2006
WO    WO 2008/024462 A2    2/2008

OTHER PUBLICATIONS

International Preliminary Report on Patentability issued by The International Bureau of WIPO dated Oct. 12, 2017, for International Patent Application No. PCT/GB2015/050959.
(Continued)

*Primary Examiner* — Emmanuel Bayard
(74) *Attorney, Agent, or Firm* — Finnegan, Henderson, Farabow, Garrett & Dunner, L.L.P.

(57) ABSTRACT

In an embodiment, a wireless communication method of transmitting a plurality of data streams from a transmitter to a receiver is disclosed. The transmitter comprises a plurality of antennas. The method comprises: encoding each of the data streams as a sequence of code words; determining a plurality of precoding transmit coefficients from channel information for each of a plurality of subcarriers, the precoding transmit coefficients defining spatial channels between the plurality of antennas of the transmitter and the receiver; determining a set of power loading factors for each spatial channel between the receiver and the transmitter, each set of power loading factors comprising a power loading factor for each of the plurality of subcarriers, by allocating power between the plurality of subcarriers to satisfy a signal to interference and noise target per code word; determining a signal for transmission by each antenna of the plurality of antennas by applying respective precoding coefficients and power loading factors to each respective sequence of code words; and transmitting each of the
(Continued)

sequences of code words on a plurality of subcarriers of at least one of the spatial channels by transmitting the respective signals for transmission from each respective antenna.

11 Claims, 5 Drawing Sheets

(51) Int. Cl.
*H04L 1/06* (2006.01)
*H04L 25/03* (2006.01)
*H04B 7/06* (2006.01)
*H04L 1/00* (2006.01)

(52) U.S. Cl.
CPC .......... *H04L 1/0606* (2013.01); *H04L 1/0618* (2013.01); *H04L 1/0625* (2013.01); *H04L 25/03898* (2013.01)

(58) Field of Classification Search
USPC ................................. 375/267, 299, 347, 349
See application file for complete search history.

(56) References Cited

U.S. PATENT DOCUMENTS

| | | | | |
|---|---|---|---|---|
| 2004/0066761 | A1* | 4/2004 | Giannakis | H03M 13/29 370/329 |
| 2007/0217538 | A1* | 9/2007 | Waxman | H04B 7/0417 375/267 |
| 2007/0270173 | A1 | 11/2007 | Niu et al. | |
| 2009/0245153 | A1* | 10/2009 | Li | H04B 7/0452 370/312 |
| 2010/0166097 | A1* | 7/2010 | Zhou | H04B 7/065 375/267 |
| 2010/0329369 | A1* | 12/2010 | Hou | H04B 7/0452 375/260 |
| 2011/0122958 | A1 | 5/2011 | Koo et al. | |
| 2011/0164695 | A1* | 7/2011 | Zheng | H04B 7/086 375/260 |
| 2012/0093253 | A1* | 4/2012 | Park | H04B 7/0443 375/285 |
| 2015/0358919 | A1* | 12/2015 | Chen | H04B 7/0434 370/329 |
| 2016/0142150 | A1* | 5/2016 | Lyubomirsky | H04J 14/0257 398/182 |
| 2017/0187442 | A1* | 6/2017 | Luddy | H04J 11/00 |
| 2017/0373742 | A1 | 12/2017 | Sandell | |

OTHER PUBLICATIONS

Riera-Palou et al., "Space-frequency linear precoding with optimal detection for MIMO-OFDM systems," Wireless Days (Oct. 20, 2010), pp. 1-5.

Schubert et al., "Solution of the Multiuser Downlink Beamforming Problem With Individual SINR Constraints," IEEE Transactions on Vehicular Technology (Jan. 2004), 53:18-28.

Shi et al., "Per-Antenna Power Constrained Rate Optimization for Multiuser MIMO Systems," 2008 International ITG Workshop on Smart Antennas (2008), pp. 270-277.

* cited by examiner

WIRELESS COMMUNICATION METHODS AND APPARATUS

FIELD

Embodiments described herein relate generally to precoding and the allocation of power between subcarriers during precoding.

BACKGROUND

Precoding is a technique used in wireless transmission where multiple data streams are spatially multiplexed by an access point (AP) to a number of receiving stations (STAs) by using multiple transmit antennas. This transmission mode is sometimes referred to as downlink multi-user multiple-input and multiple-output (DL-MU-MIMO). The design of the precoder can be divided into two separate functional blocks: 1) the transmit filters, for example zero-forcing (ZF) or minimum mean-square error (MMSE), with unit norm columns and 2) the power loading. In a typical DL-MU-MIMO transmission orthogonal frequency-division multiplexing (OFDM) is used to modulate the signal across a wide bandwidth.

BRIEF DESCRIPTION OF THE DRAWINGS

In the following embodiments will be described as non-limiting examples with reference to the accompanying drawings in which.

DETAILED DESCRIPTION

In an embodiment, a wireless communication method of transmitting a plurality of data streams from a transmitter to a receiver is disclosed. The transmitter comprises a plurality of antennas. The method comprises encoding each of the data streams as a sequence of code words; determining a plurality of precoding transmit coefficients from channel information for each of a plurality of subcarriers, the precoding transmit coefficients defining spatial channels between the plurality of antennas of the transmitter and the receiver; determining a set of power loading factors for each spatial channel between the receiver and the transmitter, each set of power loading factors comprising a power loading factor for each of the plurality of subcarriers, by allocating power between the plurality of subcarriers to satisfy a signal to interference and noise target per code word; determining a signal for transmission by each antenna of the plurality of antennas by applying respective precoding coefficients and power loading factors to each respective sequence of code words; and transmitting each of the sequences of code words on a plurality of subcarriers of at least one of the spatial channels by transmitting the respective signals for transmission from each respective antenna.

In an embodiment, determining the set of power loading factors comprises allocating a power budget between the plurality of subcarriers such that signal to interference and noise per code word is maximised.

In an embodiment, all of the power loading factors are positive and non-zero.

In an embodiment, encoding each of the data streams as a sequence of code words comprises applying a forward error correcting code.

In an embodiment, determining the set of power loading factors comprises iteratively calculating a dual power factor as the ratio of a target signal to interference and noise value with a geometric mean across all subcarriers of an interference measure.

In an embodiment, a common dual power factor is calculated for all subcarriers spanned by a code word.

In an embodiment a computer readable carrier medium carries computer executable instructions which when executed on a processor cause the processor to carry out a method as described above.

In an embodiment, a transmitter for transmitting a plurality of data streams to at least one receiver is disclosed. The transmitter comprises: a plurality of antennas; an encoding module configured to encode each data stream of the plurality of data streams as a sequence of code words; a communication control module configured to determine a plurality of precoding transmit coefficients from channel information for each of a plurality of subcarriers, the precoding transmit coefficients defining spatial channels between the plurality of antennas of the transmitter and the receiver; and to determine a set of power loading factors for each spatial channel between the receiver and the transmitter, each set of power loading factors comprising a power loading factor for each of the plurality of subcarriers, by allocating power between the plurality of subcarriers to satisfy a signal to interference and noise target per code word; a precoding module configured to generate a signal for transmission by each antenna of the plurality of antennas by applying respective precoding coefficients and power loading factors to each respective sequence of code words.

In an embodiment, the communication control module is further configured to determine the set of power loading factors by allocating a power budget between the plurality of subcarriers such that signal to interference and noise per code word is maximised.

In an embodiment, the communication control module is further configured such that all of the power loading factors are positive and non-zero.

In an embodiment, the encoding module is configured to encode each data stream of the plurality of data streams by applying a forward error correcting code.

In an embodiment, the communication control module is further configured to determine the set of power loading factors by iteratively calculating a dual power factor as the ratio of a target signal to interference and noise value with a geometric mean across all subcarriers of an interference measure.

In an embodiment, the communication control module is further configured to calculate a common dual power factor for all subcarriers spanned by a code word.

Figure 1:
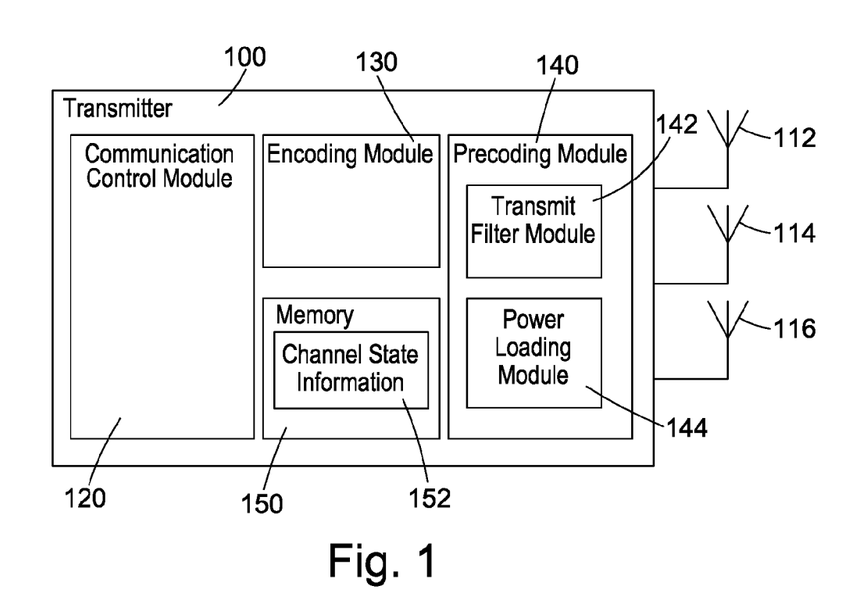
FIG. 1 shows a transmitter according to an embodiment.

FIG. 1 shows a transmitter according to an embodiment. The transmitter 100 comprises a plurality of antennas 112 114 116. The transmitter further comprises a communication control module 120; an encoding module 130; a precoding module 140; and a memory 150. The precoding module comprises a transmit filter module 142 and a power loading module 144. The memory 150 stores channel state information 152.

The transmitter 100 may be an access point (AP) of a wireless network such as a Wireless Local Area Network (WLAN) according to one of the IEEE 802.11 family of standards or a mobile data network according to a 3GPP Long Term Evolution (LTE) standard. In use, the transmitter 100 transmits multiple data streams that are spatially multiplexed to a number of receiving stations using the plurality of antennas 112 114 116.

The communication control module 120 controls the transmission of the data streams. The channel state information 152 stored in the memory 150 is determined from information fed back to the transmitter 100 by the receiving stations.

Figure 2:
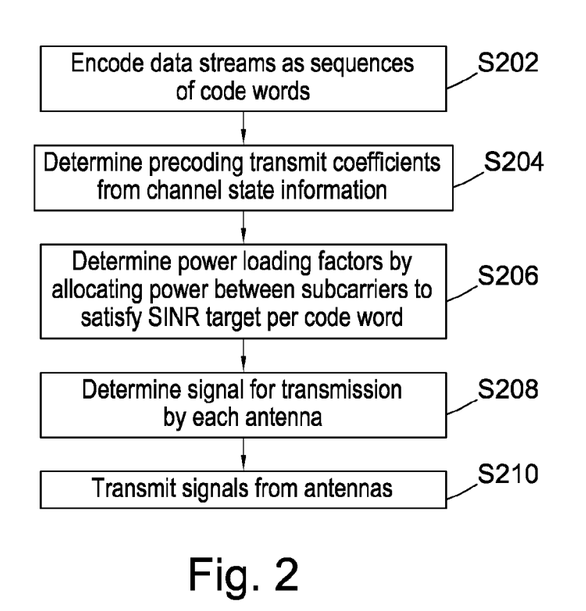
FIG. 2 shows a method of transmitting a plurality of data streams to a receiver according to an embodiment.

FIG. 2 shows a method of transmitting a plurality of data streams to a receiver according to an embodiment. The method shown in FIG. 2 may be carried out by the transmitter 100 shown in FIG. 1. The method is used to transmit multiple data streams. The multiple data streams may be transmitted to a single user, or a plurality of users.

In step S202, the encoding module 130 encodes the data streams to be transmitted as sequences of code words. Each data stream is parsed and encoded as a sequence of code words. The data streams are encoded using an error correcting code.

In step S204, the communication control module 120 determines precoding transmit coefficients from the channel state information 152 stored in the memory 150. The precoding transmit coefficients define spatial channels between the antennas 112 114 116 of the transmitter 100 and the receivers.

In step S206, the communication control module 120 determines power loading factors. The power loading factors specify the amount power to be loaded on to each of the subcarriers. In step S206, the communication control module allocates power between the plurality of subcarriers to satisfy a target signal to interference and noise ratio (SINR) per code word.

In an embodiment, the communication control module 120 allocates a power budget between the subcarriers so that a minimum effective SINR per code word is maximised.

In an embodiment, the communication control module 120 ensures that each of the subcarriers is allocated a power greater than zero. That is, the communication control module ensures that each of the power loading factors is positive and non-zero. This avoids allocating zero power to some of the subcarriers as this would require additional signalling to indicate which subcarriers are in use for each spatial stream.

In step S208, the precoding module 140 determines a signal for transmission by each of the antennas 112 114 116. The transmit filter module 142 applies the calculated precoding coefficients to each respective sequence of code words to determine the signals to be transmitted by each spatial stream. The power loading module 144 applies the power loading factors to each subcarrier to obtain the signals to be transmitted by each of the respective antennas.

In step S210 the signals are transmitted from the respective antennas.

Figure 3:
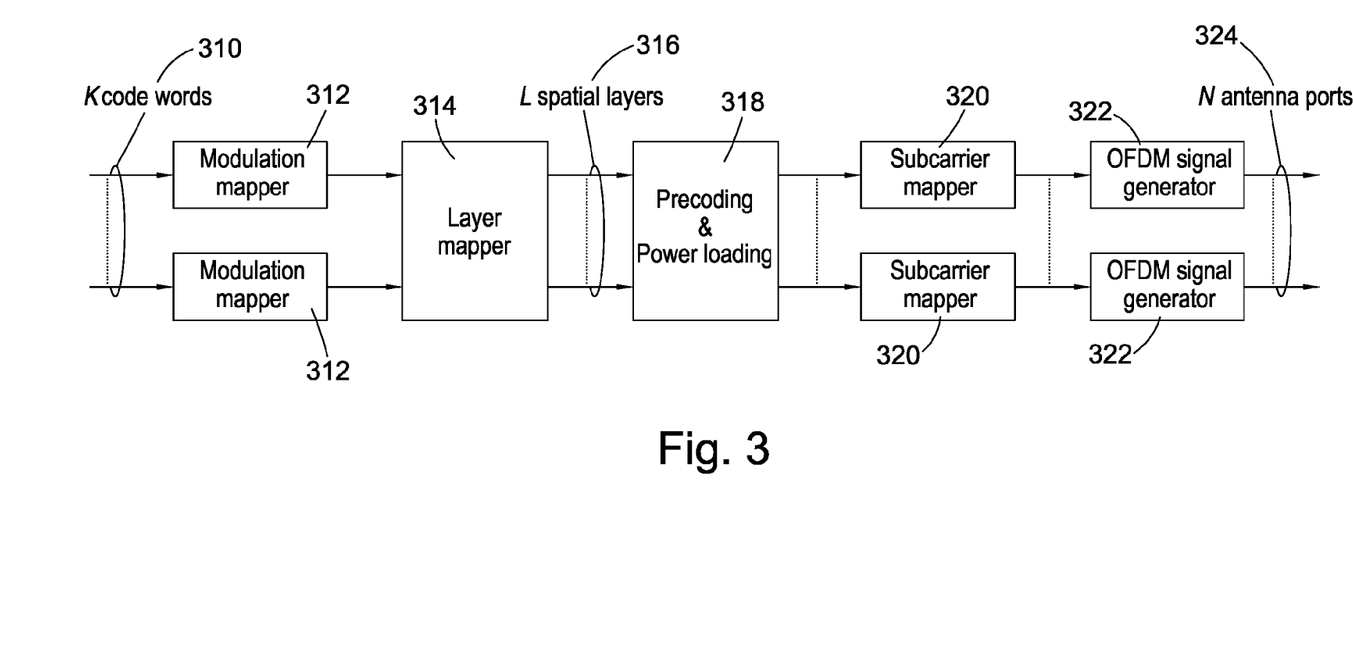
FIG. 3 shows a block diagram of the processing in a transmitter according to an embodiment.

FIG. 3 shows a block diagram of the processing in a transmitter according to an embodiment. The embodiment shown in FIG. 3 is a DL-MU-MIMO transmission in a mobile network according to a 3GPP LTE standard.

As shown in FIG. 3, K data streams are encoded to form K code words 310. Each of the K code words 310 is input to a modulation mapper 312. The modulation mapper 312 maps the bit values of input signal to complex modulation symbols within a modulation scheme. The output from the modulation mapper 312 is input into a layer mapper 314. The layer mapper 314 splits the data sequence into L spatial layers 316. Precoding and power loading 318 is applied to the spatial layers 316. The precoding and power loading is described in more detail below. Following the precoding and power loading 318, the L spatial layers are mapped onto subcarriers by subcarrier mappers 320. Orthogonal frequency-division multiplexing (OFDM) symbols are generated 322 for transmission on the subcarriers. The generated symbols are sent to N antenna ports 324 for transmission using the spatial channels defined by the precoding transmit coefficients.

Figure 4:
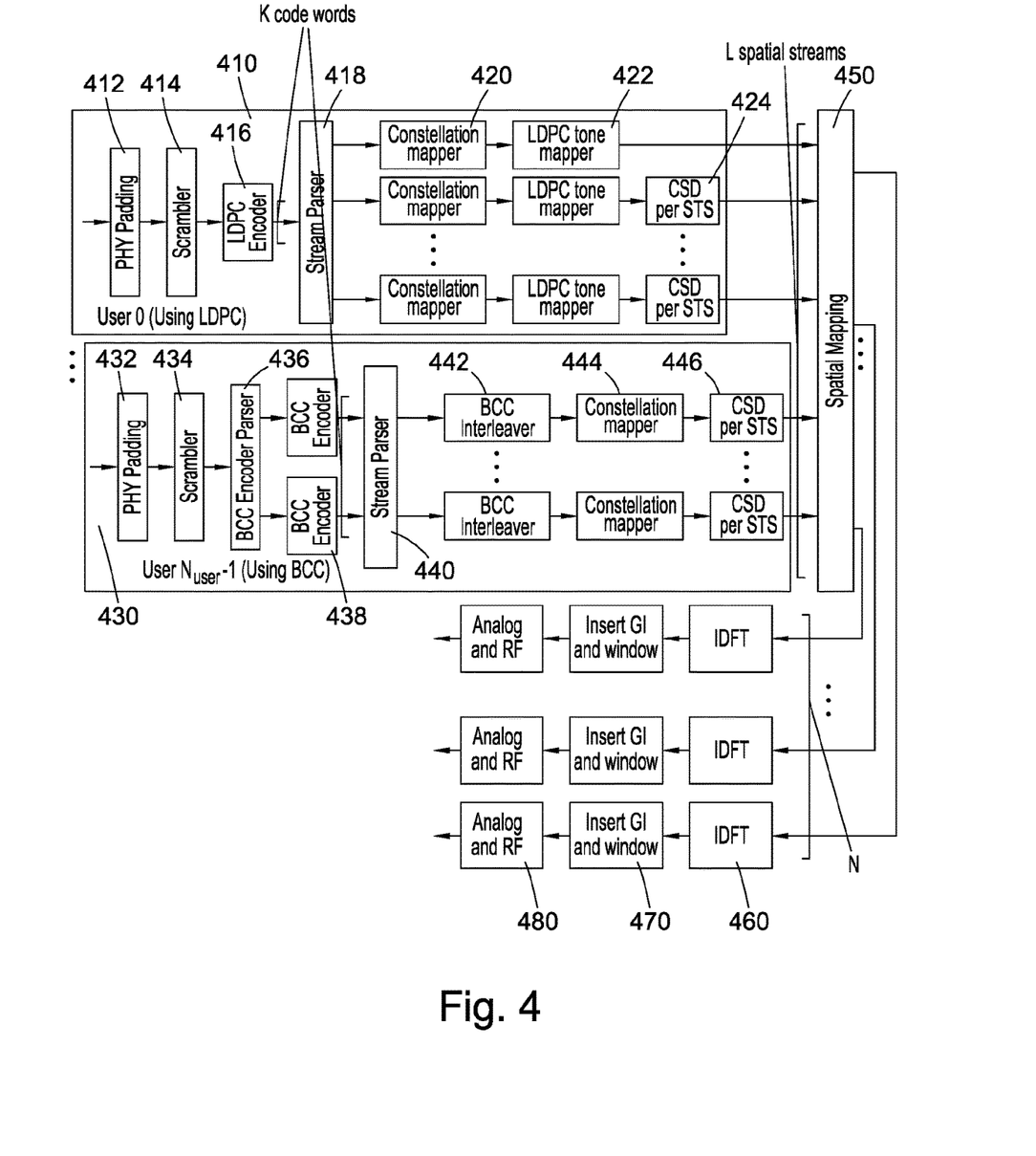
FIG. 4 shows a block diagram of the processing in a transmitter according to an embodiment.

FIG. 4 shows a block diagram of the processing in a transmitter according to an embodiment. The embodiment shown in FIG. 4 is a DL-MU-MIMO transmission in a wireless local area network (WLAN) transmitter according to the IEEE 802.11 family of standards.

The system shown in FIG. 4 comprises a first user, User 0 400 using a low-density parity-check (LDPC) code, and a second user, User $N_{user}$-1 430 using a block check character (BCC) code.

The first user 410 applies physical layer (PHY) padding to the input stream of data which adds padding bits. The input data stream is then scrambled by a scrambler 414. The scrambled data stream is encoded by an LDPC encoder 414. The output from the LDPC encoder 414 is a set of code words. The code words are parsed by a stream parser 418 into data streams. Each data stream is input into a constellation mapper 420. The constellation mapper 420 takes groups of bits and maps them to specific constellation points. A LDPC tone mapper 422 maps the data constellations onto OFDM subcarriers. Cyclic shift diversity (CSD) 424 is applied so that each space time stream (STS) is given different phase shifts so that they are easily identified at the receiver. The output from the first user 410 is a set of spatial streams.

The second user 430 applies PHY padding 432 and scrambling 434 to the input signal. The scrambled signal is parsed by a block check character (BCC) encoder parser 436. The parsed signal is encoded by BCC encoders 438. The output from the BCC encoders a set of streams of code words. The code words are parsed by a stream parser 440 into data streams. The parsed data streams are interleaved by BCC interleaves 442 and mapped onto constellation points by constellation mappers 444. Cyclic shift diversity (CSD) 446 is then applied per space time stream (STS). The output from the second user 430 is a set of spatial streams.

The spatial streams from the users are input into a spatial mapping module 450. The spatial mapping module 450 maps the spatial layers onto the transmit antennas. Precoding and power loading described below may take place in the spatial mapping module 450.

The output from the spatial mapping module 450 a signal corresponding to each of the N transmit antennas. An inverse discrete Fourier transform (IDFT) 460 is applied to each signal to convert the frequency domain data into time domain data. A guard interval (GI) is inserted at the start of the simple and the symbol is windowed 470. Then analog and radiofrequency (RF) processing 480 is applied to the signal.

In the system shown in FIG. 4, the outputs from the LDPC encoder 416 and the BCC encoders 438 in combination are K code words. The input to the spatial mapping module 450 is L spatial streams and the output from the spatial mapping module is signals for N antennas.

In both systems K data streams are encoded separately with forward error correction (FEC) codes to form K code words that are transmitted to K or fewer STAs. Each code word is multiplexed onto one or more spatial layers (or streams) and across the OFDM symbol comprising $N_f$ subcarriers. Each spatial layer is identified by a set of N complex precoding weights, which are applied to the same coded symbol transmitted from each of the N transmit antennas. Generally, K is smaller or equal to the number of spatial layers L, which is smaller or equal to N. To simplify the description we assume that the number of spatial layers equals the number of code words, L=K, however the constructions can be extended to the more general case.

The precoding weights are represented mathematically by an N×K matrix, G whose columns contain the weights for each spatial layer. For a generic subcarrier, the linear precoding operation is given by $$x = Gu$$

where $u=(u_1, \ldots, u_K)^H$ contains the data symbols from the code words at a generic subcarrier. A frequency-domain sample of the multiuser signal received by the STAs for a generic subcarrier is given by $$y = Hx + n$$

where $H=(h_1, \ldots, h_K)^H$ contains in the kth row the baseband channel frequency response at the given subcarrier from the N transmit antennas to the kth STA.

The design of the precoder, G, can be divided into two separate functional blocks: 1) the power normalised transmit filters, F, whose columns have unit norm and whose aim is to separate users in the spatial domain and 2) the power loading vector p, whose role is to optimise performance, such that the precoder can be expressed in the form $$G = F \mathrm{diag}(\sqrt{p}).$$

In embodiments, the power allocation is done jointly across the subcarriers spanned by an encoded transmission to meet some code word-based performance requirement.

We consider two examples to illustrate how the code word-based power loading operates and how it differs from subcarrier-based power loading, when the precoder is zero-forcing or minimum mean-square error.

Zero-forcing (ZF) transmit filter with sum-power constraint and fairness power loading: per-subcarrier vs. per code word power loading.

For a ZF transmit filter the precoder for subcarrier i, $i=1, \ldots, N_f$ is given by $$G_i = H_i^H (H_i H_i^H)^{-1} \mathrm{diag}(\sqrt{\gamma_i})$$

with $\gamma_i = [\gamma_{1,i}, \ldots, \gamma_{K,i}]^T$. The SINR of layer k, $k=1, \ldots, K$, at subcarrier i, $i=1, \ldots, N_f$ is given by $$\gamma_{k,i} = \frac{p_{k,i}}{b_{k,i}}$$

where $p_{k,i}$ is the power loading factor for layer k and subcarrier i, and $b_{k,i}$ is the transmit filter norm given by $$b_{k,i} = [(H_i H_i^H)^{-1}]_{k,k}$$

where $H_i$ is the K×N MU-MIMO channel for subcarrier i.

In a ZF power loading that aims at maximising the minimum user SINRs per subcarrier, with total power budget P, the power-loading factor is given by $$p_{k,i} = \frac{b_{k,i}}{\sum_{k=1}^{K} b_{k,i}} P \quad (1)$$

This strategy ensures that the same power is loaded on each subcarrier and that the SINR in each subcarrier is the same for all spatial layers.

However, for a wideband encoded transmission, in embodiments, we can relax this constraint and require that the total transmit power per OFDM symbol meets the target $PN_f$ and that the minimum effective SINR per code word is maximised.

Let us define the effective SINR per code word, $\gamma_k$, with $k=1, \ldots, K$, such that it fulfils the following identity $$\log(1+\gamma_k) = \frac{1}{N_f} \sum_{i=1}^{N_f} \log(1+\gamma_{k,i}) \quad (2)$$

The optimisation problem can be formulated as $$\max_{\{p_{k,i}\}} \min_k \gamma_k \quad (3)$$

$$\text{s.t.} \quad \sum_{k=1}^{K} \frac{1}{N_f} \sum_{i=1}^{N_f} p_{k,i} \leq P$$

$$p_{k,i} > 0.$$

Note that we force the power values $p_{k,i}$ to be strictly positive to avoid allocating zero power to a spatial layer on some subcarriers. This would require additional signalling to indicate which subcarriers are used by each spatial stream.

It can be shown that the solution is of water-filling type. Because zero power loading is not allowed, there is a minimum transmit power for which the "water level" is high enough to ensure that all subcarriers are allocated positive power. This minimum power is given by $$P_{min} = \max_{k,i} \left\{ \frac{b_{k,i}}{\vec{b}_k^{(g)}} \right\} \sum_{k=1}^{K} \vec{b}_k^{(g)} - \sum_{k=1}^{K} \vec{b}_k^{(a)}$$

where $\vec{b}_k^{(a)}$ and $\vec{b}_k^{(g)}$ denote the arithmetic and geometric mean, respectively, of the ZF filter norms $\{b_{k,i}\}_{i=1}^{N_f}$, i.e.

$$\vec{b}_k^{(a)} = \frac{1}{N_f} \sum_{i=1}^{N_f} b_{k,i}$$

$$\vec{b}_k^{(g)} = \left[ \prod_{i=1}^{N_f} b_{k,i} \right]^{1/N_f}$$

If $P > P_{min}$, then a solution to problem (3) exists and problem (3) is solvable. Conversely, if $P \leq P_{min}$ we adopt the following strategy: we calculate the power loading for sum power $P_{min}$ and then we adjust the transmit power level by the ratio $P/P_{min}$. In this case more power than the budget is allocated which is enough to load all subcarriers. Then, the transmit power is scaled by a factor so the allocated power on all subcarriers stays non-zero. In this case, there may be one subcarrier with no power in order to avoid this, $P_{min}$ may be adjusted and $P_{min}+\epsilon$ used in its place for some small $\epsilon$.

Therefore, the general per-code word power loading solution can be shown to be $$p_{k,i} = (\bar{\mu}_k - b_{k,i}) \frac{P}{\max\{P, P_{min}\}} \quad (4)$$

with $$\bar{\mu}_k = \frac{\bar{b}_k^{(g)}}{\sum_{k=1}^{k} \bar{b}_k^{(g)}} \left( \max\{P, P_{min}\} + \sum_{k=1}^{K} \bar{b}_k^{(a)} \right) \quad (5)$$

Minimum mean-square error (MMSE) transmit filter with sum-power constraint and fairness power loading: per-subcarrier vs. per-code word power loading.

As for the case with ZF transmit filters, the power allocation aims at achieving the same SINR for all spatial layers. One way to do this is to allocate power for a target SINR and repeat the allocation with larger or smaller target depending on whether the resulting total power falls below or above the budget. Therefore, the solution to the fairness power allocation problem is essentially the same as that for target SINRs. In the following we describe the difference between subcarrier-based and code word-based power loading for target SINRs.

The MMSE-type transmit filter for a DL-MU-MIMO system, with unit norm columns and for a generic subcarrier i, is given by $$F_i = (I + H_i^H \text{diag}(q_i) H_i)^{-1} H_i^H \text{diag}(\alpha_i)$$

where $\alpha_i = [\alpha_{1,i}, \ldots, \alpha_{K,i}]^T$ are scaling factors that normalise the column norm to one. For these transmit filters the SINR of layer k, k=1, ..., K, at subcarrier i, i=1, ..., $N_f$, is given by $$\gamma_{k,i} = q_{k,i} \beta_{k,i} \quad (6)$$

where $q_{k,i}$ is the dual power loading factor and $\beta_{k,i}$ is the interference term, given by $$\beta_{k,i} = \frac{\eta_{k,i}}{1 - q_{k,i}\eta_{k,i}} \quad (7)$$

$$\eta_{k,i} = h_{k,i}^H \sum_i^{-1} h_k$$

$$\sum_i = I + \sum_{i=1}^{K} q_i h_i h_i^H.$$

In a per-subcarrier power loading with fixed target SINRs $t_k$, the dual factors $q_{k,i}$ for layers k=1, ..., K at subcarrier i are found from (6) by calculating $$q_{k,i} = \frac{t_k}{\beta_{k,i}} \quad (8)$$

iteratively until the formula converges. Convergence is guaranteed if the MU-MIMO channel is non-singular. In practice, it has been found that very few iterations are needed to find the solution.

Once the dual power loading is found, the power loading factors, $p_i = [p_{k,i}]$, for subcarrier i are found by calculating $$p_i = \left[ \text{diag}\left\{ \left(1 + \frac{1}{\gamma_{k,i}}\right) \Phi_{k,k}^{(i)} \right\} - \Phi^{(i)} \right]^{-1} 1 \quad (9)$$

where $\Phi^{(i)} = [\Phi_{h,k}^{(i)}]$ is the cross-talk matrix for subcarrier i such that $\Phi_{h,k}^{(i)} = |h_{h,i}^H f_{k,i}|^2$ and $f_{k,i}$ is the kth column of the transmit filter $F_i$.

In the per-code word power loading of embodiments, we use the definition of SINR for the kth encoded transmission given in (2) and find the solution to the power allocation problem with target SINRs $t_k$ $$\min_{\{q_{k,i}\}} \sum_{k=1}^{K} \frac{1}{N_f} \sum_{i=1}^{N_f} q_{k,i}$$

s.t. $\gamma_k \geq t_k, k = 1, \ldots, K$ $q_{k,i} > 0$

This problem is not easily tractable because the constraints are not concave due to the complicated dependency of the interference terms $\beta_{k,i}$ on the dual powers $q_{k,i}$. In order to find a solution that is amenable to implementation we add the constraint that the dual powers are equal across the subcarriers, $q_{k,i} = q_k$ and we introduce a lower bound to the code word SINR $$\gamma_k \geq q_k \left[ \prod_{i=1}^{N_f} \beta_{k,i} \right]^{\frac{1}{N_f}} \triangleq q_k \bar{\beta}_k^{(g)}$$

It can be shown that the solution is found iteratively by applying the simple formula $$q_k = \frac{t_k}{\bar{\beta}_k^{(g)}} \quad (10)$$

where the interference geometric mean term is computed from (7). The power loading factors are then calculated from the dual factor by applying (9).

Therefore, by comparing (8) and (10), the main differences between the per-subcarrier power loading and the per-code word power loading method of calculating the dual power loading factors is that individual per-subcarrier factors are replaced by a single factor for all the subcarriers spanned by a code word and the per-subcarrier interference terms are replaced by their geometric mean.

Figure 5:
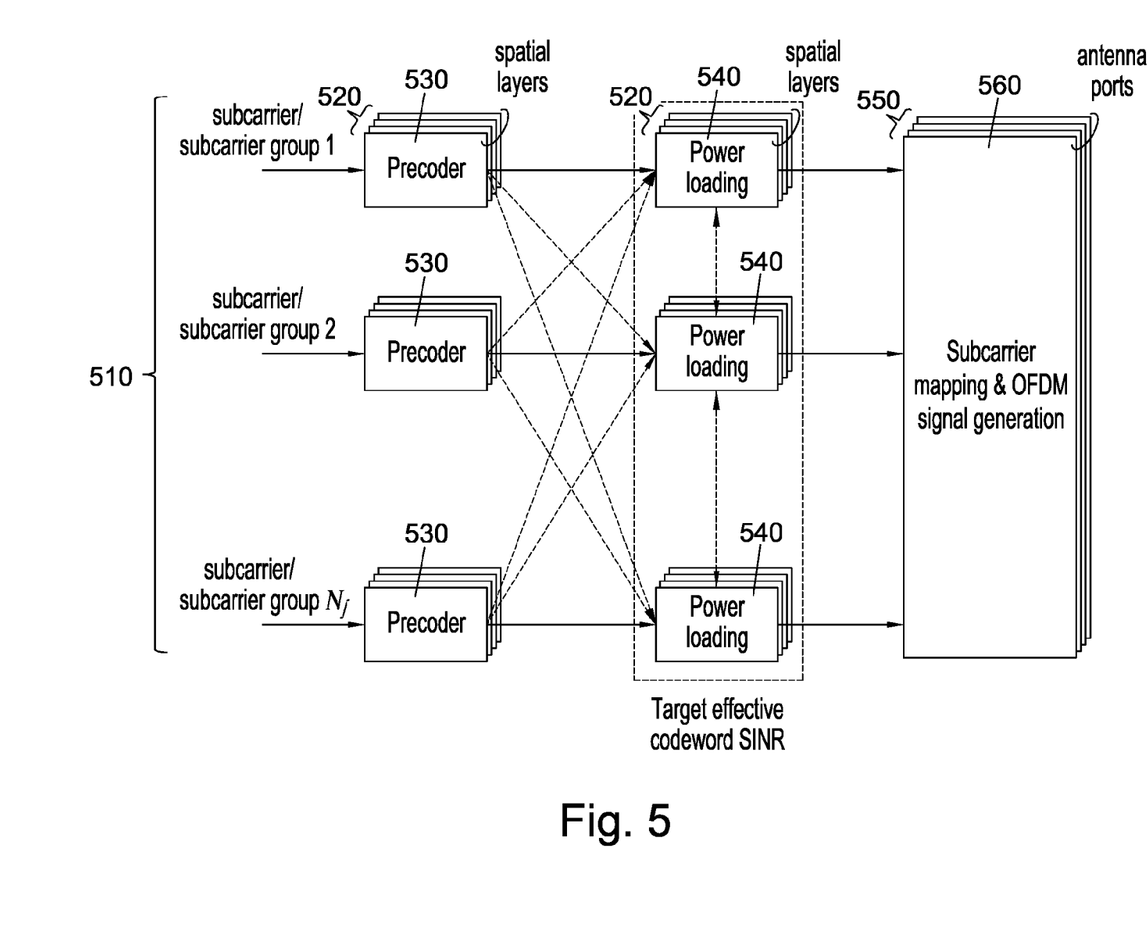
FIG. 5 shows a precoder and power loader according to an embodiment.

FIG. 5 shows a precoder and power loader according to an embodiment. Precoding is carried out for a plurality of subcarriers or subcarrier groups 510. Each subcarrier group spans a plurality of spatial layers 520. A precoder 530 maps input signals on to the spatial layers 520 for each of the subcarrier groups 510. A power loader 540 performs power loading for each of the subcarrier groups 510. As shown in FIG. 5, power loading is computed jointly for the subcarriers or groups of subcarriers spanned by the code words. The power loading on one subcarrier is affected by the power loading and precoding on the other subcarriers. In FIG. 5, the dashed lines indicate that the output from the precoder 530 for one of the subcarriers or subcarrier groups affects the power loading for other ones of the subcarrier groups. Once power loading has been performed, subcarrier mapping and OFDM symbol generation 560 is performed for each of N antenna ports 550

Embodiments have the following advantages. Modulation and coding adaptation is carried out for the whole code word. This means that if one subcarrier is in a deep fade or highly interfered, the target effective SINR per code word can be achieved with less transmit power than if a target is set for each subcarrier by, for example, assigning more power to the good subcarriers. Additionally, only a single power optimisation problem is solving for the set of subcarriers spanned by a code word. Thus embodiments have low complexity. Further, in embodiments it is guaranteed that all subcarriers are allocated positive power with reduced power fluctuations across the subcarriers.

We consider two examples to show the benefits of the new per-code word power allocation. We consider an OFDM-based DL-MU-MIMO system with 4 transmit antennas at the AP and 1 receive antenna for each of the 4 STAs and channel models B and D defined for the IEEE 802.11ac standard. We compare sum-rate, sum-power and execution time (i.e. the processing time taken by a general purpose CPU to execute the power loading routines) of per-subcarrier and per-code word power loading for different OFDM symbol sizes. We assume the encoded transmission is multiplexed across the whole OFDM symbol and that the method allocates power independently for each subcarrier.

In the first example we test a ZF precoder and a fairness power allocation strategy that ensures the largest equal SINR for all STAs for a target sum-power.

Figure 6:
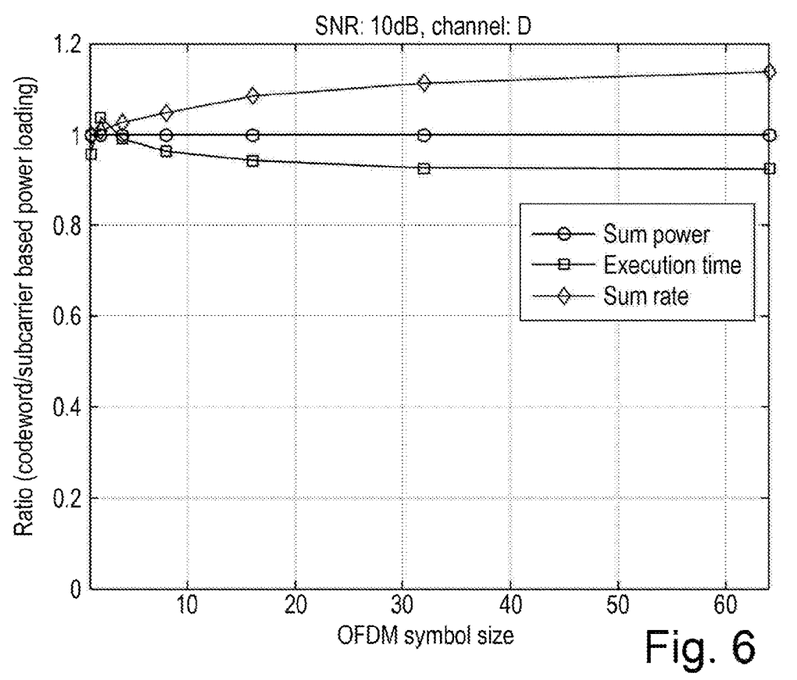
FIG. 6 shows the performance of a precoder according to an embodiment using zero forcing (ZF) precoding.

FIG. 6 shows the ratio between per code word and per subcarrier power loading for the three parameters of interest at an operating SNR of 10 dB. We can see that the new technique provides higher throughput and lower complexity for any practical OFDM symbol size.

In the second example we test an MMSE precoder with the same target SINR of 20 dB. In this case the resulting sum rate is fixed but the sum-power and execution time varies with the power allocation strategy.

Figure 7:
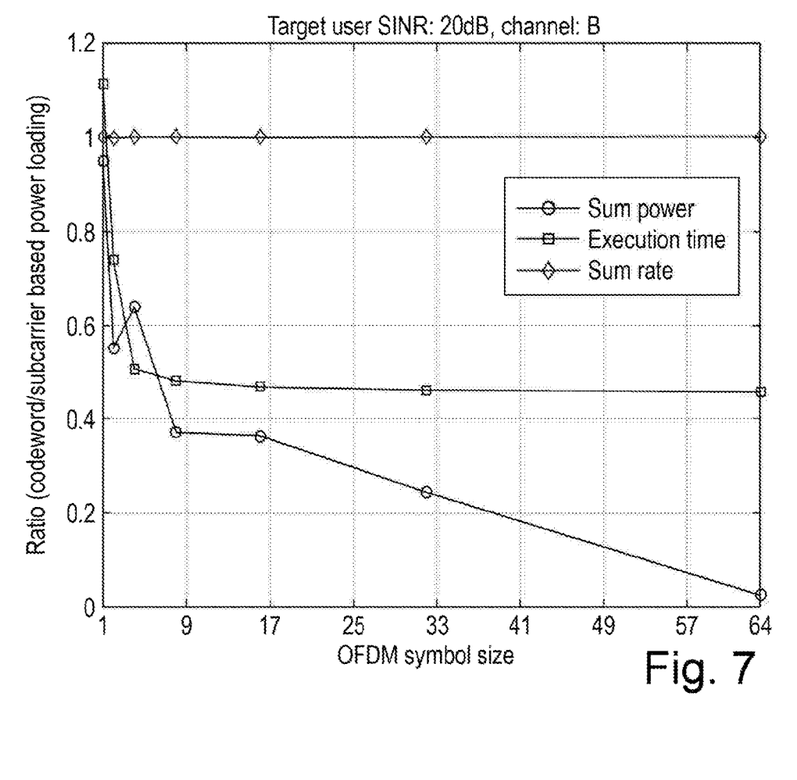
FIG. 7 shows the performance of a precoder according to an embodiment using minimum mean square error (MMSE) precoding.

FIG. 7 shows that the per-code word power allocation provides a significant reduction in both sum-power and complexity compared to a per-subcarrier loading.

The codeword based power loading strategy described herein can be applied to any other system configuration where a number of codewords are transmitted across the subcarriers of an OFDM-modulated system. Examples of such configurations besides downlink multi-user MIMO (DL-MU-MIMO) include downlink Orthogonal Frequency-Division Multiple Access (OFDMA) and cooperative multi-point (CoMP) precoding.

The specific embodiments are presented schematically. The reader will appreciate that the detailed implementation of each embodiment can be achieved in a number of ways. For instance, a dedicated hardware implementation could be designed and built. On the other hand, a processor could be configured with a computer program, such as delivered either by way of a storage medium (e.g. a magnetic, optical or solid state memory based device) or by way of a computer receivable signal (e.g. a download of a full program or a "patch" update to an existing program) to implement the management unit described above in relation to the embodiments. Besides these two positions, a multi-function hardware device, such as a DSP, a FPGA or the like, could be configured by configuration instructions.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless communication method of transmitting a plurality of data streams from a transmitter to a receiver, the transmitter comprising a plurality of antennas, the method comprising:
    encoding each of the data streams as a sequence of code words;
    determining a plurality of precoding transmit coefficients from channel information for each of a plurality of subcarriers, the precoding transmit coefficients defining spatial channels between the plurality of antennas of the transmitter and the receiver;
    determining a set of power loading factors for each spatial channel between the receiver and the transmitter, each set of power loading factors comprising a power loading factor for each of the plurality of subcarriers associated with the spatial channel, wherein each power loading factor is determined by allocating power between the plurality of subcarriers such that a minimum effective signal to interference and noise ratio per code word is maximized;
    determining a signal for transmission by each antenna of the plurality of antennas by applying respective precoding coefficients and power loading factors to each respective sequence of code words; and
    transmitting each of the sequences of code words on the plurality of subcarriers associated with at least one of the spatial channels by transmitting the respective signals for transmission from each respective antenna.

2. A method according to claim 1, wherein all of the power loading factors are positive and non-zero.

3. A method according to claim 1, wherein encoding each of the data streams as a sequence of code words comprises applying a forward error correcting code.

4. A method according to claim 1, wherein determining the set of power loading factors comprises iteratively calculating a dual power factor as the ratio of a target signal to interference and noise value with a geometric mean across all subcarriers of an interference measure.

5. A method according to claim 4 wherein a common dual power factor is calculated for all subcarriers spanned by a code word.

6. A non-transitory computer readable carrier medium carrying computer executable instructions which when executed on a processor cause the processor to carry out a method according to claim 1.

7. A transmitter for transmitting a plurality of data streams to at least one receiver, the transmitter comprising:
    a plurality of antennas;
    an encoder configured to encode each data stream of the plurality of data streams as a sequence of code words;
    a processor configured to determine a plurality of precoding transmit coefficients from channel information for each of a plurality of subcarriers, the precoding transmit coefficients defining spatial channels between the plurality of antennas of the transmitter and the receiver; and to determine a set of power loading factors for each spatial channel between the receiver and the transmitter, each set of power loading factors comprising a power loading factor for each of the plurality of subcarriers associated with the spatial channel, wherein each power loading factor is determined by allocating power between the plurality of subcarriers such that a minimum effective signal to interference and noise ratio per code word is maximized; and a precoder configured to generate a signal for transmission by each antenna of the plurality of antennas by applying respective precoding coefficients and power loading factors to each respective sequence of code words.

8. A transmitter according to claim 7, wherein the communication control module is further configured such that all of the power loading factors are positive and non-zero.

9. A transmitter according to claim 7, wherein the encoding module is configured to encode each data stream of the plurality of data streams by applying a forward error correcting code.

10. A transmitter according to claim 7, wherein the communication control module is further configured to determine the set of power loading factors by iteratively calculating a dual power factor as the ratio of a target signal to interference and noise value with a geometric mean across all subcarriers of an interference measure.

11. A transmitter according to claim 7, wherein the communication control module is further configured to calculate a common dual power factor for all subcarriers spanned by a code word.

* * * * *